Patented Aug. 2, 1932

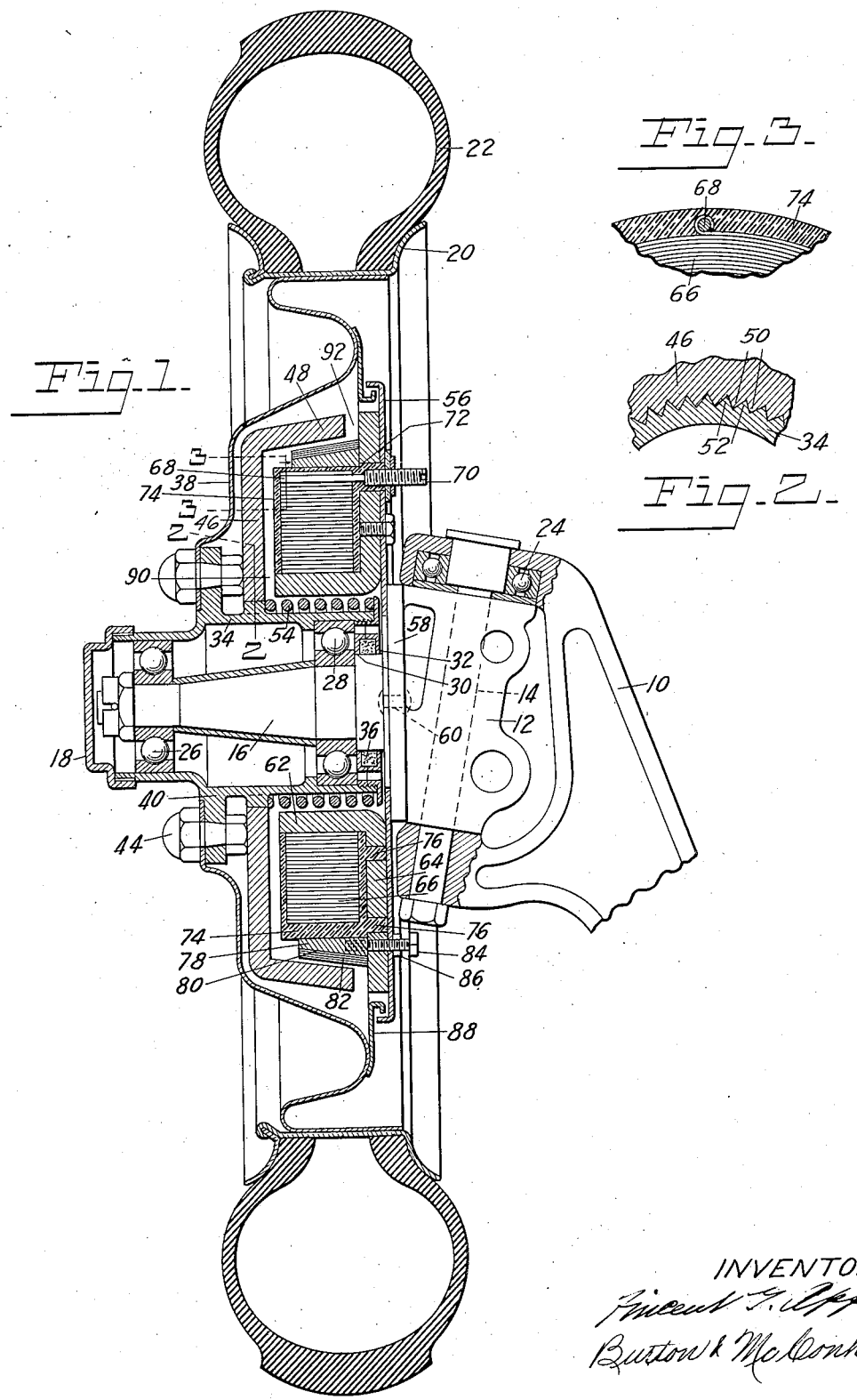

1,869,876

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

ELECTROMAGNETIC AUTOMOTIVE VEHICLE BRAKE

Application filed February 23, 1929. Serial No. 341,382.

This invention relates to vehicle brakes of the class wherein stationary and moving friction elements are brought into engagement with each other by electro-magnetic means, and wherein the brake friction members, their operating means and associated supporting parts are of novel construction and arranged and correlated upon the wheel in a novel manner, and an object of the invention is to provide a structure having maximum brake applying force for its size.

Another object is to so construct the magnetic element as to insure protection against water or other foreign matter which might accidentally get within the mechanism, and to so mount and support the same upon the hub and with respect to the brake friction members as to occupy a minimum protected space and to operate with a maximum of efficiency.

Another object is to provide readily accessible novel adjusting means to compensate for wear, which cooperate in a novel combination with the brake friction member, support therefor, and actuating means.

Other objects will become apparent to those skilled in the art as the invention is described in detail and reference is made to the drawing, wherein Fig. 1 is a vertical axial section through a front vehicle wheel to which my brake is applied.

Fig. 2 is a part section taken at 2—2 Fig. 1.

Fig. 3 is a part section taken at 3—3 Fig. 1.

In the drawing the front axle 10, steering knuckle 12, knuckle pin 14, spindle 16, hub cap 18, rim 20, tire 22 and bearings 24, 26 and 28 are of substantially standard construction.

The nut and lock nut 30 and 32 secure the outer race of bearing 28 to hub 34 and together form a recess for felt washer 36.

The wheel disc 38 varies from the conventional only in that it is suitably formed to admit the special braking mechanism herein described. It is secured to flange 40 of hub 34 by nuts 44 in the usual manner.

The brake drum 46 differs greatly from the conventional drum in that it is composed of heavier material and has a tapered outer rim 48. The inner diameter has a series of teeth 50 which are slidably fitted over corresponding teeth 52 on hub 34 (see Fig. 2). By these teeth drum 46 is rotatedly driven by hub 34 but is axially movable thereon. A spring 54 urges drum 46 toward the wheel disc 38 and the inner bolt of securing nut 44, which projects slightly inwardly of the wheel disc 38, functions as a stop to limit the outer movement of said drum under the urge of the spring. The drum 46 is preferably made of a material having a high degree of magnetic permeability.

The backing plate 56 is held to flange 58 of knuckle 12 by rivets 60, and the stationary elements of the brake are secured thereto.

A hollow core 62 having an outwardly extending flange 64 is wound with a plurality of turns 66 of strip copper or other conductive material. The inner turn of the strip is welded or otherwise electrically secured to the core and is thereby grounded to the vehicle frame. The outer turn is curled around a plain end 68 of binding post screw 70 and electrically joined thereto by welding or similar means (see Fig. 3). A relatively large opening 72 through flange 64 and backing plate 56 permits binding post screw 70 to pass through, leaving space around it. A cover 74 of insulation is then molded around the coil and binding post, and into a plurality of openings as at 76 through flange 64 whereby the coil is secured to the flange and protected by the cover against moisture, grease or other foreign material.

A ring 78 having tapered outer periphery 80 is faced with brake lining material 82 of suitable friction coefficient. Ring 78 is concentrically supported by the cover 74 and may be moved axially thereover for adjustment as to take up for wear. A series of circumferentially spaced apart adjusting screws, one of which appears at 84, extend through tapped holes in flange 64 and are therefore adapted to urge ring 78 axially and away from the flange. Another series of circumferentially spaced apart adjusting screws, one of which appears at 86, extend through clearance holes in flange 64 into tapped holes in ring 78 and are therefore adapted to draw ring 78 toward the flange.

By loosening all of the one kind of screws and tightening all of the other kind, ring 78 may be adjusted axially and secured in any position within the range of the adjusting screws.

A flanged ring 88, preferably of non-magnetizable material, closes the space between wheel disc 38 and backing plate 56 leaving a running clearance between.

In operation a source of electric power such as a storage battery has one terminal grounded to the vehicle frame and the other connected by cable to binding post screw 70 with a suitable controller in the circuit. When the circuit is closed drum 46 is drawn against spring 54 toward core 62 and flange 64, tending to close the gaps 90 and 92. The ring 78 however is so adjusted that the rotating drum 46 engages the stationary facing 82 before gaps 90 and 92 are entirely closed thereby causing braking of the moving elements to be effected. When the electric circuit is again broken the spring 54 returns drum 46 to its normal unoperated position.

Wear of facing 82 may be compensated for by adjusting the screws 84 and 86 as described and, since a magnetic structure of the kind shown is capable of exerting its greatest effort just before the gaps 90 and 92 are completely closed, it is important that, in making these adjustments the ring 78 be so positioned axially as to permit engagement of rim 48 with facing 82 just before the gaps are closed.

I claim:

1. A vehicle brake comprising, in combination, a wheel hub, a friction member rotatable therewith but axially movable thereon and adapted to transmit torque directly thereto, a cooperating stationary friction member, an electric coil adapted to actuate said movable friction member into engagement with said stationary friction member, and means to return said axially movable friction member when magnetization thereof is discontinued.

2. In a vehicle brake, a wheel, a friction member coupled directly therewith but having limited movement along its axis, a stationary friction member adapted to be engaged by said movable friction member, an electric coil adapted to cause limited movement of said movable friction member, and means to adjust said stationary friction member to such position as will insure engagement of the two friction members just before the movable member reaches the limit of its movement.

3. In a vehicle brake, a wheel, a brake drum rotatable therewith and having a conical rim, said drum having limited movement along the axis of the wheel, a stationary conical member adapted to be frictionally engaged by said conical rim, an electric coil adapted to move said drum axially into engagement with said stationary conical member.

4. In a vehicle brake, a wheel, a brake drum rotatable therewith and having a conical rim, said drum having limited movement along the axis of the wheel, a stationary conical member adapted to be frictionally engaged by said conical rim, an electric coil adapted to move said drum axially into engagement with said stationary conical member and means to axially adjust and affix said conical member in such position as will permit engagement of said rim and stationary member just before the limit of axial travel of said drum is reached.

5. In a vehicle brake, a wheel, a wheel driven axially movable conical-rimmed brake drum, a backing plate, a flanged core, an axially adjustable cone adapted to be frictionally engaged by the conical rim of said drum, an electric coil wound on said core and adapted to draw said drum into frictional engagement with said cone.

6. In a vehicle brake, a wheel, a wheel driven axially movable conical-rimmed brake drum, a backing plate, a flanged core, an axially adjustable cone adapted to be frictionally engaged by the conical rim of said drum, an electric coil wound on said core and adapted to draw said drum into frictional engagement with said cone, and means to axially adjust and rigidly affix said cone to such position as will compel engagement with said rim just before said drum and said core come together.

7. In a vehicle brake, the combination of a rotatably driven axially movable conical-rimmed brake drum, a backing plate, a flanged core secured to said backing plate, an electric coil wound on said core and adapted to magnetically energize said drum and said core whereby said drum is drawn toward said core, a cone around said coil and within said drum positioned to engage and stop axial movement of said drum just before said drum meets said core.

8. Vehicle brake mechanism comprising, in combination, a wheel, a brake drum carried thereby and rotatable therewith but movable axially thereover, a cooperating non-rotatable friction member, an electric coil having an annular angular core arranged partly within said drum and spaced a limited distance from the inner peripheral margin thereof and partly outside of the drum and spaced a limited distance from the outer periphery thereof, and adapted to actuate said movable friction member into braking engagement with the non-rotatable friction member.

9. Vehicle brake mechanism comprising, in combination, a wheel, a brake drum carried thereby and rotatable therewith but movable axially thereover, an electric coil having an annular angular core arranged partly within said drum and spaced a limited distance from the inner peripheral margin thereof and partly outside of the drum and spaced substantially the same limited distance from the outer peripheral margin of the drum, said coil having a winding about the core within the drum, a non-rotatable friction member arranged within the drum about the winding of the coil to be frictionally engaged by the movable friction member.

10. Vehicle brake mechanism comprising, in combination, a wheel, a brake drum carried thereby and rotatable therewith but movable axially thereover, an electric coil having an annular angular core arranged partly within said drum and spaced a limited distance from the inner peripheral margin thereof and partly outside of the drum and spaced substantially the same limited distance from the outer peripheral margin of the drum, said coil having a winding about the core within the drum, a non-rotatable friction member arranged within the drum about the winding of the coil to be frictionally engaged by the movable friction member and movable to adjusted positions over the coil winding toward and away from the core of the coil.

11. Vehicle brake mechanism comprising, in combination, a wheel, a friction member coupled directly therewith but movable axially with respect thereto, a stationary backing plate, a second friction member carried by the backing plate and adapted to be frictionally engaged by the movable friction member, two sets of screws carried by the backing plate, each set being adjustable to position the second friction member with respect to the backing plate, one set in one direction and the other set in the opposite direction.

12. Vehicle brake mechanism comprising, in combination, a wheel, a brake drum carried thereby and rotatable therewith but movable axially thereover, an electric coil having an annular angular core arranged partly within said drum, a non-rotatable friction member arranged about said coil and adapted to be frictionally engaged thereby, a spring arranged within said core exerting an axial thrust on the movable friction member with respect to the non-rotatable friction member.

13. Vehicle brake mechanism comprising, in combination, a wheel, a brake drum carried thereby and rotatable therewith but movable axially thereover, an electric coil having an annular angular core arranged partly within said drum, a winding upon the core within the drum, a non-rotatable friction member arranged within the drum above the winding, said coil adapted to draw the movable frictional member into braking engagement with the non-rotatable friction member, and a spring within the core exerting a thrust upon the movable friction member holding the same yieldingly away from the non-rotatable friction member.

14. Vehicle brake mechanism comprising, in combination, a wheel having a hub provided with a disk supporting flange, a brake drum mounted upon the hub to rotate therewith but movable axially thereover, and means securing the disk to the flange of the hub and engaging the said drum to assist in positioning the same upon the hub.

15. Vehicle brake mechanism comprising, in combination, a wheel having a hub provided with a flange adapted to support a brake friction member, a friction member mounted on said flange for axial movement thereover, said flange and friction member having interengaging projections whereby they rotate as one piece, a coil spring about the hub engaging said friction member at one end tending to position the friction member upon the flange.

16. In combination with apparatus of the class described, a wheel hub and a brake drum secured directly thereto to permit axial movement with respect thereto.

17. In combination with apparatus of the class described, a wheel hub and a brake drum secured directly thereto to permit axial movement with respect thereto, and means retaining said drum at one extremity of its axial range of movement.

18. In combination with brake mechanism of the class described, a brake drum having an internal frictional peripheral surface, a wheel hub having a wheel disc secured thereto, said drum being secured to said wheel hub to permit limited axial movement of the former along the latter, means for limiting such axial movement in both directions, and means for normally retaining said drum at one extremity at its axial range of movement.

19. In combination with brake mechanism of the class described, a wheel supporting hub, and a drum of magnetizable material having an internal peripheral friction surface splined to said hub to permit axial movement of said drum therealong.

20. Brake mechanism for a rotatable wheel comprising, in combination, stationary brake friction means, a magnetizable brake drum carried by the wheel to rotate therewith but movable axially thereof into braking engagement with said stationary brake friction means.

21. Brake mechanism for a rotatable wheel comprising, in combination, a magnetizable drum carried by the wheel to rotate therewith but movable axially thereover, and stationary brake friction means arranged from the drum to be engaged thereby to retard its rotation.

22. Brake mechanism for a rotatable wheel having a hub and a hollow enclosure thereabout comprising a magnetizable brake drum supported on the hub within said enclosure to rotate with the hub but movable axially thereover, non-rotatable brake friction means arranged within said drum within the enclosure, and electro-magnetic means arranged within said drum within the enclosure operable to actuate the drum to engage the non-rotatable brake friction means to retard the rotation of the wheel.

23. Brake mechanism for a vehicle wheel having a hub provided with a wheel disc supporting flange, brake friction means coupled with the hub for rotation but movable axially thereover, a wheel disc and means securing said disc to the flange on the hub, said means cooperating to assist in positioning said axially movable brake friction means.

24. Brake mechanism for a vehicle wheel having a hub comprising, in combination, a brake friction disc coupled with the hub for rotation but movable with respect thereto, and a wheel supporting element secured to the hub by means adapted to assist in positioning said brake friction disc on the hub.

25. Brake mechanism for a vehicle wheel having a hub comprising, in combination, a brake friction disc coupled with the hub for rotation movable axially thereover, and a wheel supporting element secured to the hub by means adapted to assist in determining the position of said brake friction disc on the hub.

26. Brake mechanism comprising, in combination, a channel of insulation material and an electric coil arranged within said channel, a brake friction member encircling said channel and adjustably slidable thereover, and a second brake friction member of magnetizable material adapted to be acted upon to be drawn into engagement with said first brake friction member.

27. Brake mechanism comprising, in combination with a rotatable brake drum, an annular channel of insulating material arranged within the drum, a magnetic coil within said channel, an annular brake friction element encircling said channel and slidably supported upon the base thereof for adjustment axially thereover.

28. Brake mechanism for a vehicle wheel having a hub provided with a wheel supporting disc shaped to inwardly overhang said hub, a stationary backing plate, an annular member carried by said disc cooperating with said backing plate forming an enclosure about the hub, and electro-magnetic friction means arranged within said enclosure.

In testimony whereof, I, VINCENT G. APPLE, sign this specification.

VINCENT G. APPLE.